United States Patent [19]

Acharya et al.

[11] 4,280,082
[45] Jul. 21, 1981

[54] DIGITAL DC MOTOR SPEED CONTROL CIRCUIT

[75] Inventors: Rajguru M. Acharya, Neptune Township, Monmouth County, N.J.; James R. Del Signore, II, Ithaca, N.Y.

[73] Assignee: NCR Corporation, Dayton, Ohio

[21] Appl. No.: 32,449

[22] Filed: Apr. 23, 1979

[51] Int. Cl.³ .............................................. H02P 5/16
[52] U.S. Cl. .................................. 318/341; 318/327; 318/310; 318/329
[58] Field of Search ............... 318/326, 327, 328, 341, 318/310, 329, 604, 599

[56] References Cited

U.S. PATENT DOCUMENTS

| | | | |
|---|---|---|---|
| 3,355,649 | 11/1967 | Boylan et al. | 318/329 |
| 3,409,814 | 11/1968 | Azuma et al. | 318/327 |
| 3,596,162 | 7/1971 | Takayama | 318/327 |
| 3,836,756 | 9/1974 | Yamamoto et al. | 318/636 |
| 4,109,184 | 8/1978 | Weber | 318/327 |

*Primary Examiner*—David Smith, Jr.
*Attorney, Agent, or Firm*—J. T. Cavender; Wilbert Hawk, Jr.; Richard W. Lavin

[57] ABSTRACT

A speed control circuit for a motor is responsive to variations in motor supply voltage and torque wherein a digital output indication of the actual speed of the motor is generated. The digital output is converted to an analog value and applied to a comparator which also receives the output voltage of a ramp circuit based on the motor supply voltage. The output of the comparator controls the width of the motor voltage pulses applied from a power amplifier to the motor in which the voltage pulses applied have proportionally larger width for a smaller level of motor supply voltages or decrease in the amount of motor shaft speed and proportionally narrow width pulses for increased levels of motor supply voltage or an increase in the amount of motor shaft speed. A one-shot network is provided for motor stall protection.

11 Claims, 2 Drawing Figures

DIGITAL DC MOTOR SPEED CONTROL CIRCUIT

BACKGROUND OF THE INVENTION

The present invention relates generally to the control of the speed of electrical motors, and more particularly, to a system for digitally controlling the speed of a D.C. motor.

In present-day high-speed carriage drive matrix printing devices, the voltage requirements of the motor driving the carriage vary due to the number of printing elements that are firing and other load conditions. In addition, the torque on the motor changes due to the stopping and starting of the carriage as the printing mechanism completes a line of printing. Thus, the motor is subject to varying supply voltages and torque loads which affect the speed of the motor and the operation of the printing mechanism. In those printing mechanisms in which a printing carriage is operated to move the print mechanism across the printing medium, high current loads are encountered which require speed control circuits employing high-cost power transistors and other high-cost circuit elements. It is therefore a principal object of this invention to provide a speed control circuit which allows a high current D.C. motor to maintain a constant speed over a varying supply voltage and varying torque loads. It is another object of this invention to provide a low-cost speed control circuit for a high current D.C. motor which can function under the aforementioned operating conditions.

SUMMARY OF THE INVENTION

In order to carry out these objects, there is provided a pulse generator coupled to the output of the motor drive shaft for generating pulses representing each dot column of a character printed by the printing mechanism. The pulses are applied to a logic circuit which, upon the occurrence of each dot column pulse, will clear a counter which has been counting pulses generated by an oscillator and latch the output of the counter into a holding register. The count represents the number of oscillator pulses which occur during the time of duration of each dot column pulse. The output count of the holding register is transmitted to a digital-to-analog converter comprising a network of resistors which converts the digital count into an analog reference voltage. The reference voltage is applied to the non-inverting input of a comparator whose inverting input receives a ramp voltage having a slope based on the level of the motor supply voltage. The output of the comparator controls the time a power pulse is applied to the motor, thereby controlling the speed of the motor. Upon the value of the ramp voltage developed reaching the level of the reference voltage, the output of the comparator is switched, controlling the length of time the power pulse is applied to the motor and thereby controlling the speed of the motor. The generation of each pulse will trigger a one-shot network which disables the supplying of the power pulses to the motor in the case of a motor stall condition.

DESCRIPTION OF THE PREFERRED EMBODIMENT

Figure 1:
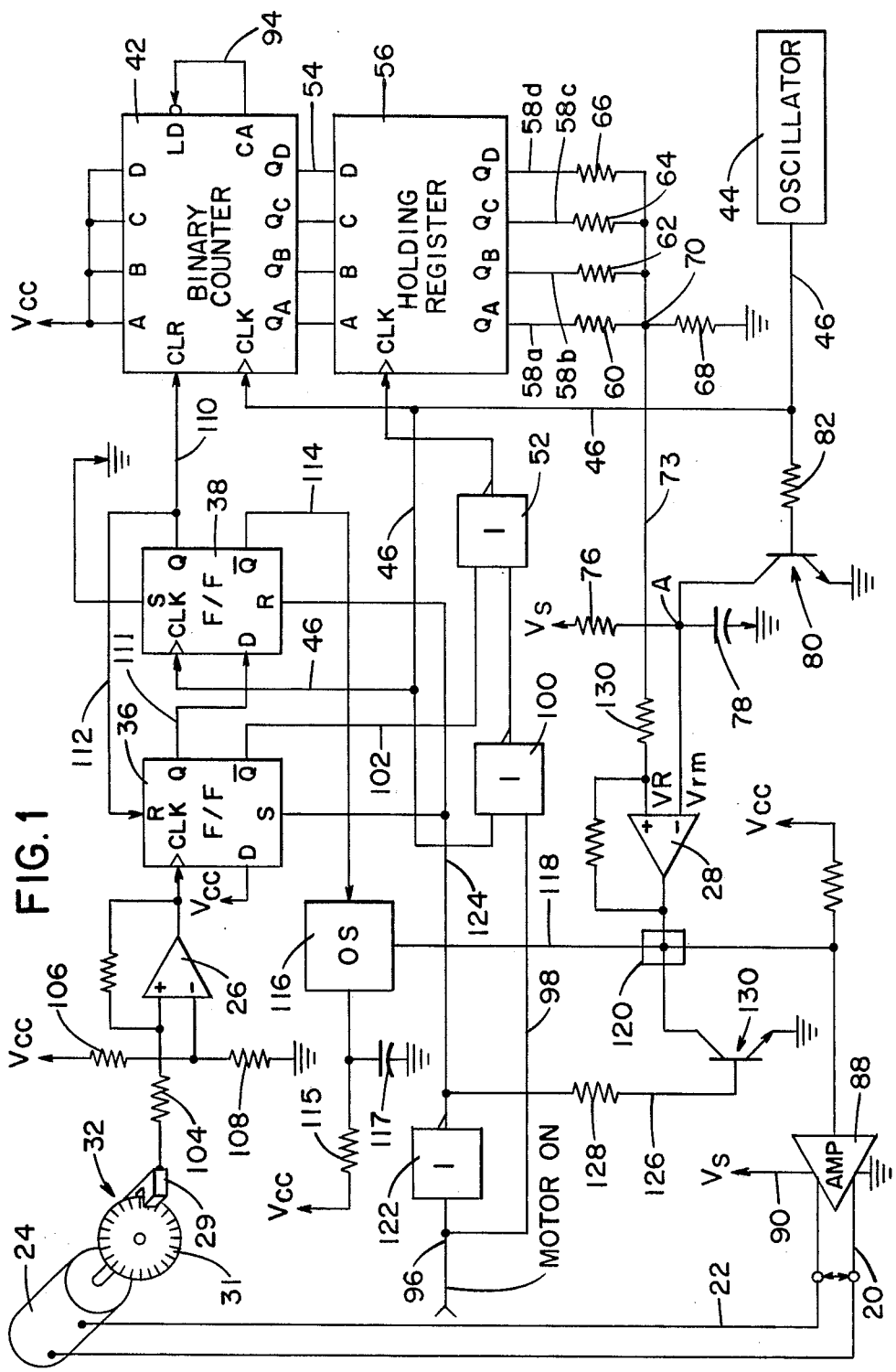
FIG. 1 is a schematic diagram of a motor control circuit incorporating the principles of the invention.

A schematic diagram of the motor control circuit in accordance with the principles of the present invention is shown in FIG. 1. The circuit provides a voltage waveform upon the output lines 20, 22 for driving a D.C. motor 24, which waveform is in the form of pulses which varies in width depending on the speed of the motor 24 in order to provide a constant motor speed under varying torque and/or motor supply voltage conditions. The D.C. motor disclosed can be employed in many applications such as tape and document transport systems, but the circuit of the present invention is particularly well-suited for driving a motor employed in a high-speed printing apparatus in which the print mechanism is mounted on a carriage driven by the D.C. motor across a printing medium during a printing operation.

The circuit of FIG. 1 includes a pair of standard linear integrated voltage comparators 26 and 28 which may be of any well-known type such as part no. LM339 sold by the National Semiconductor Corporation of Santa Clara, California. The comparator 26 functions as a buffer with hysteresis for noise immunity and has applied to its non-inverting input an analog waveform 30 (FIG. 2A) representing a dot column pulse generated by a tachometer strobe assembly generally indicated as 32 (FIG. 1) and which is mounted on the drive shaft of the motor 24 in a manner that is well-known in the art. The tachometer strobe 32 may be composed of an infrared optical sensor sensing reference elements located on a wheel 31 secured to the drive shaft of the motor 24. The waveform 30 (FIG. 2A) generated by the strobe assembly 32 is selected to represent the time during which one character is printed by the printing mechanism (not shown) driven by the motor 24. The waveform 30 is shaped by the amplifier 26 to output the squared waveform 34 (FIG. 2B) whose leading edge will clock a D-type flip-flop 36 resulting in the appearance on its Q output of a high signal which is applied to the D input of a second D-type flip-flop 38. Flip-flop 38 is clocked by signals 40 (FIG. 2C) received over line 46 and generated by a free-running oscillator 44 which, in the present example, generates pulses at a frequency of 9 Khz. The flip-flops 36 and 38 may be of any well-known type such as part no. LM4013 manufactured by the previously-mentioned National Semiconductor Corporation.

Figure 2:
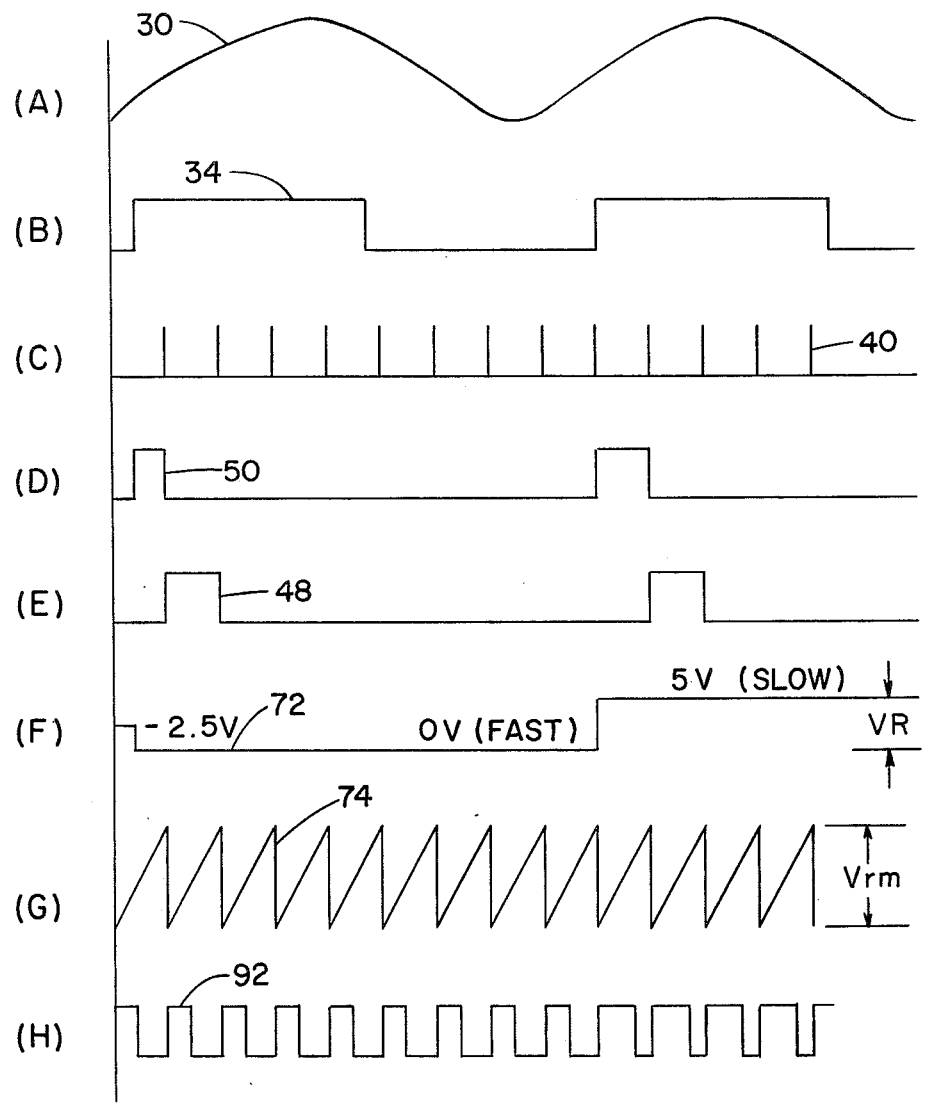
FIGS. 2A–2H are waveform diagrams with signals appearing at several places in the circuit of FIG. 1.

The Q output of flip-flop 38 is coupled to the clear input of a binary counter 42 whose clock input is coupled to the oscillator 44 over the line 46. The counter 42 is a standard presettable binary counter wired to keep all outputs high when an overflow occurs. The counter 42 counts the oscillator pulses 40 received until cleared by a pulse 48 (FIG. 2E) appearing on the Q output of flip-flop 38. The pulse 48 will clear the counter 42 enabling the counter 42 to initiate another count representing the time of occurrence of the next dot column pulse waveforms 30 (FIG. 2A) and 34 (FIG. 2B). Thus, the count appearing on the output of the counter 42 at the time the pulse 48 is generated represents the actual speed of the motor 24.

As shown in FIG. 2B, upon the occurrence of the leading edge of the dot column pulse waveform 34, a pulse 50 (FIG. 2D) is generated on the output of a NOR gate 52 (FIG. 1), which pulse functions as a clock pulse and is transmitted to a holding register 56 latching the binary count appearing on output lines 54 of the counter 42 into the holding register 56. Upon the occurrence of the trailing edge of a pulse 50, the pulse 48 (FIG. 2E) appears on the Q output of flip-flop 38 clearing the counter 42. The output lines 58a–58d inclusive of the register 56 are coupled to a D/A converter which comprises a network of resistors 60–68 inclusive. Resistors 60–66 inclusive are wired in parallel with each resistor representing a binary weight. The resistor 60 has a value eight times that of resistor 66 and which in the present embodiment represents a binary weight of one. Correspondingly, the resistors 60–66 inclusive are wired in series with resistor 68 having a value which is a binary multiple of resistor 66. In the present embodiment, the value of resistor 68 is the same as that of resistor 60. The voltage level appearing at the node 70 will be proportional to the binary count appearing on the output lines 58a–58d inclusive of the register 56. Thus, if the motor 24 is rotating faster than some prescribed nominal speed, the binary count appearing on the output of the counter 42 and the register 56 will be small compared to the count representing the nominal speed. When the motor 24 is turning at a speed slower than normal, the binary count will be large. The voltage level appearing at the node 70 (waveform 72 of FIG. 2F) will reflect this relationship.

Thus, assuming that the voltage level for a nominal speed of the motor is 2.5 volts, the voltage level of the waveform 72 (FIG. 2F) appearing at the node 70 (FIG. 1) will swing between 0 volts and 5.0 volts as the speed of the motor varies with respect to the prescribed nominal speed of the motor 24. The counter 42 and the register 56 may be of any type that is commercially available at present. Examples of a counter 42 that is presently available is part no. LM40193B while register 56 may be part no. LM4035, both also manufactured by the previously-mentioned National Semiconductor Corporation.

The voltage appearing at the node 70 and which will be referred to as a reference voltage $V_R$ hereinafter, is transmitted over line 73 to the non-inverting input of the comparator 28 having an open collector output and is biased for noise immunity. As is well-known in the art, the output of the amplifier 28 will go from high to low upon the level of the voltage appearing at the inverting input of the amplifier 28 equalling the voltage $V_R$ appearing at the non-inverting input of the amplifier 28. The voltage applied to the inverting input of amplifier 28 is a ramp voltage whose waveform 74 (FIG. 2G) is developed by an RC network comprising resistor 76 coupled to the motor voltage supply $V_s$, which in the present application is 28 volts, and the capacitor 78. A NPN transistor 80 is connected to the RC network at point A with its base element coupled to the output of the oscillator 44 through a base limiting resistor 82.

Upon the generation of each oscillator pulse 40 (FIG. 2C), transistor 80 will conduct thereby shorting the capacitor 78 to ground. As soon as the pulse is removed from point A, the capacitor 78 is charged through the resistor 76 producing the waveform 74 (FIG. 2G) of the ramp voltage $V_{rm}$ which voltage is applied to the inverting input of the comparator 28. This ramp voltage $V_{rm}$ rises until it equals the reference voltage $V_R$ present at the non-inverting input at which time the output signal of the comparator 28 goes low.

The output of the comparator 28 is coupled through a wired AND gate 120 to a power amplifier 88 which amplifies the motor supply voltage V received over line 90. The output voltage pulses 92 (FIG. 2H) of the amplifier 88 is applied over the lines 20 and 22 to the motor 24. It will be seen from this arrangement that upon the discharge of the capacitor 78 the ramp voltage signal $V_{rm}$ appearing at the inverting input of the comparator 28 will be lower than the voltage signal $V_R$ appearing at the non-inverting input of comparator 28, resulting in the output signal of comparator 28 going high. This output signal enables the power amplifier 88 to supply the voltage pulse 92 (FIG. 2H) to the motor 24, thereby increasing the speed of the motor during the time the ramp voltage $V_{rm}$ stays below the reference voltage $V_R$. When the ramp voltage $V_{rm}$ meets the reference voltage $V_R$, the output signal of comparator 28 will go low turning off the voltage pulses 92 (FIG. 2H) being applied to the motor 24. Thus, the width of the pulse 92 is determined by the time required for the ramp voltage $V_{rm}$ to equal the reference voltage $V_R$. The power amplifier 88 may be part no. 2N3055 manufactured by Motorola, Inc. of Phoenix, Arizona.

As described previously, the speed of the motor 24 may be affected by variations in the torque applied to the motor and the motor supply voltage $V_s$. Slowing down of the motor 24 due to an increase in torque applied to the motor will increase the binary count output of the register 56 in a manner previously described. This condition will increase the value of the reference voltage $V_R$ and therefore increase the time for the ramp voltages $V_{rm}$ to reach the reference voltage $V_R$ resulting in an increase in the width of the pulse 92 (FIG. 2H) together with a corresponding increase in the speed of the motor 24. When the motor speeds up due to a decrease in the applied torque, the reference voltage $V_R$ is decreased due to the generation of a lower binary count by the counter 42 resulting in a decrease in the width of the pulse 92 together with a corresponding decrease in the speed of the motor 24.

In the case where the motor 24 is running at a nominal speed and its supply voltage $V_s$ increases, the slope of the ramp voltage waveform 74 (FIG. 2G) is increased resulting in the ramp voltage $V_{rm}$ reaching the reference voltage $V_R$ in a shorter time. This action results in a decrease in the width of the voltage pulse 92, thereby maintaining constant speed of the motor 24. A decrease in the supply voltage $V_s$ produces an increase in the pulse width and again results in maintaining a constant motor speed. Thus, the circuit provides an efficient speed control of the motor 24 where either the torque or the supply voltage applied to the motor varies with operating conditions.

There will now be described a more detailed operation of the circuit shown in FIG. 1. At the start of the operation of the motor 24, the output of the counter 42 will have been preloaded with all "ones" by a carry signal appearing on line 94. This condition produces the maximum width of the pulse 92 (FIG. 2H) to bring the motor to operational speed in the shortest time possible. To initiate a print operation, a MOTOR ON logical one control signal will appear on line 96 and is transmitted over line 98 to one input of the NOR gate 100, enabling the gate to invert the oscillator pulses 40 (FIG. 2C) received from the oscillator 44 over line 46, which pulses are outputted through NOR gate 100 to one input of the NOR gate 52. The other input to the NOR gate 52 is coupled over line 102 to the $\overline{Q}$ output of the flip-flop 36 whose output signal is a logical one at this time. When this output signal goes low in a manner to be described hereinafter, a high signal is gated by the NOR gate 52 to the clock input of the register 56 enabling the register to store the output count of the counter 42 which at this time is at the maximum count. As the result of the loading of this count into the register 56, the maximum reference voltage $V_R$ is established at the non-inverting input of comparator 28 resulting in the maximum width of the pulse 92 (FIG. 2H) being generated to initiate the operation of the motor 24. For purposes of this description, positive logic is assumed for all logical elements disclosed.

Once the motor 24 is in operation, the analog voltage signal 30 (FIG. 2A) representing a dot column pulse generated by the tachometer strobe assembly 32 and developed over resistor 104 is applied to the non-inverting input of the comparator 26. A voltage developed across the voltage divider network of resistors 106 and 108 is applied to the inverting input of comparator 26 resulting in the comparator 26 outputting the squared dot column pulse 34 (FIG. 2B) to the clock input of the flip-flop 36. Thus, the analog signal 30 is buffered and shaped by the comparator 26.

The flip-flops 36 and 38 comprise a control circuit for generating a clock signal upon the sensing of the rising edge of the dot column pulse 34 (FIG. 2B. The D input of flip-flop 36 is always high being coupled to the 5 volt logic supply voltage $V_{cc}$. When the leading edge of the pulse 34 goes high, the Q output of flip-flop 36 goes high, which signal is transmitted over line 111 to the D input of flip-flop 38. Simultaneously with this occurrence, the $\overline{Q}$ output of flip-flop 36 goes low, which signal is transmitted over line 102 to the NOR gate 52, enabling the NOR gate to output a logical one or high signal to the clock input of the register 56, thereby latching the output of the counter 42 in the manner described previously.

Upon the D input of the flip-flop 38 going high, the Q output of the flip-flop 38 will go high at the time the next oscillator pulse is received over line 46 at the clock input of the flip-flop 38. The high signal appearing at the Q output of the flip-flop 38 will be transmitted over line 110 to the clear input of the counter 42, thereby clearing the counter 42 and initiating a new count in the counter 42. The high signal appearing at the Q output will also reset the flip-flop 36 over line 112. The 9 Khz. frequency of the oscillator 44 was selected to provide the occurrence of 8 oscillator pulses 40 (FIG. 2C) during the generation of each dot column pulse 34 (FIG. 2B) to constitute the nominal speed of the motor 24 (FIG. 1). Any variation from this value occurring in the output of the counter 42 will produce a variation in the width of the pulse 92 (FIG. 2H) to return the motor to its nominal speed in the manner described previously. Thus, upon the occurrence of each dot column pulse 34 the output of the counter 42 is latched into the holding register 56 and the counter 42 is cleared to initiate a new count.

The clocking of the flip-flop 38 upon the occurrence of the leading edge of the dot column pulse 34 (FIG. 2B) will produce a logical zero or low signal at the $\overline{Q}$ output, which signal is transmitted over line 114 to a standard retriggerable one-shot network 116, thereby triggering the one-shot network 116 for a predetermined time period. In this case the time period is 100 milliseconds developed by the RC circuit comprising resistor 115 and capacitor 117 (FIG. 1) coupled to the 5 volt logic supply voltage $V_{cc}$. If the one-shot 116 is not retriggered during this time period, which in most instances would indicate a motor jam condition, the one-shot 116 will time out and output a low signal over line 118 to the wired AND gate 120 resulting in the wired AND gate 120 outputting a low signal to the power amplifier 88, thereby turning off the amplifier. As shown in FIG. 1, the motor 24 is restarted by the generation of the high MOTOR ON signal over line 96, which signal is inverted by an inverting buffer 122 and transmitted over line 124 to the reset input of flip-flop 38. Upon the occurrence of the trailing edge of the MOTOR ON signal, the output signal of the inverting buffer 122 will go high, thus resetting the flip-flop 38 and enabling the $\overline{Q}$ output of the flip-flop 38 to retrigger the one-shot 116 upon the occurrence of the next dot column pulse 34. The inverting buffer 122 may be any standard inverter which is commercially available.

The output of the inverting buffer 122 is also coupled over line 126 through a limiting resistor 128 to the base of a transistor 130, enabling the transistor 130 to disable the wired AND gate 120 and the power amplifier 88 by shorting the inputs to the AND gate 120 to ground during the generation of the MOTOR ON signal. The transistors 130 and 80 may be part no. 2N3904 manufactured by the RCA Corporation.

A feature of the circuit shown in FIG. 1 is the D/A converter comprising the resistors 60–68 inclusive in which the most significant bit of the count latched in the holding register 56 would have the most binary weight. In this case a larger voltage drop across resistor 68 would be required while in the case of the least significant bit, a smaller voltage drop would have to occur. Thus the resistor 66 located in the output line 58d of the register 56 in which the most significant bit appears would have a value $\frac{1}{8}$ of the value of the resistor 60 located in the output line 58a in which there is the least significant bit of the count latched in the register 56. The value of the resistors 62 and 64 would have values representing the corresponding binary weight of two and four respectively. As the binary count increases, the analog voltage output appearing at the node 70 will increase proportionately. The resistor 68 in series with the resistors 60–66 inclusive and having a value equal to the resistor 60 provides the proper output analog voltage. Thus, as shown in FIG. 2F, the level of the reference voltage $V_R$ appearing at the node 70 (FIG. 1) may vary between 5.0 volts and 0 volts depending on the speed of the motor 24.

The reference voltage $V_R$ appearing at the node 70 over line 73 is transmitted through a bias resistor 130 to the non-inverting input of the comparator 28. The ramp voltage $V_{rm}$ developed at the junction A in the manner described previously is applied to the inverting input of the comparator 28 in the manner described previously. Upon the occurrence of the ramp voltage equalling the reference voltage, the output signal of the comparator 28 will switch from high to low, which signal disables the wired AND gate 120, whose output will go low, thereby turning off the power supply 88 and the motor drive pulse 92 (FIG. 2H). Since the ramp voltage is generated upon the occurrence of each oscillator pulse 40 (FIG. 2C), the power level supplied to the motor 24 is changing at a much faster rate than the generation of the dot column pulse 30 (FIG. 2A). Thus the D.C. motor 24 is seeing some average voltage and thereby provides no noticeable change of speed of movement of the printing carriage.

The supply voltage $V_s$ applied to the power amplifier 88 over line 90 and to the RC network of resistors 76 and capacitor 78 is arbitrarily selected to be much larger than the supply voltage $V_{cc}$ applied to the integrated chip network in the circuit so as to provide a linear ramp waveform at the inverting input of the comparator 28 in order to maintain a linear change in the output of the comparator 28. The supply voltage $V_s$ in the present embodiment is an unregulated 28 volts.

Typical values of the components of the circuit can be as follows:

| Resistor | Value |
|---|---|
| 60 | 80K |
| 62 | 40K |
| 64 | 20K |
| 66 | 10K |
| 68 | 80K |
| 76 | 220K |
| 82 | 56K |
| 106 | 33K |
| 108 | 22K |
| 115 | 1.2 Meg |
| 128 | 10K |
| 130 | 120K |

| Capacitor | Value |
|---|---|
| 78 | 470 pf |
| 117 | .1 uf |

Although the invention has been described and illustrated with a certain degree of particularity, it is understood that the present disclosure has been made only by way of example and that numerous changes in the details of construction and the combination of arrangements of parts may be resorted to without departing from the spirit and scope of the invention as hereinafter claimed.

What is claimed is:

1. A circuit for controlling the speed of a D.C. motor to which a variable torque and a voltage pulse is applied to the motor and where the width of the pulse is inversely proportional to the speed of the motor, comprising:
    a source of supply voltage whose level varies with the speed of the motor;
    pickup means mounted on said motor for generating a plurality of analog waveform signals representing the rotational speed of the motor;
    logic means coupled to the output of said pickup means for generating a reset rectangular waveform signal for each analog waveform signal received;
    a source of clock pulses;
    counter means coupled to said source of clock pulses and to the output of said logic means to count said clock pulses and to be reset with each reset signal;
    means coupled to the output of said counter means to generate a time-varying reference voltage signal in accordance with the output count of said counter means;
    means coupled to said supply voltage for generating a ramp voltage whose slope varies in accordance with the level of the supply voltage applied to the motor;
    comparing means coupled to said reference signal generating means and said ramp voltage generating means for generating a control signal upon said ramp voltage becoming equal to said voltage output;
    and amplifier means coupled to the output of said comparing means and said supply voltage for outputting a voltage pulse to the motor whose width is selected substantially in accordance with the time said control signal is generated by said comparing means.

2. The circuit of claim 1 in which said reference signal generating means includes a storage means coupled to the output of said counter means for storing the output of said counter means when enabled, said storage means coupled to said logic means and enabled to store the output of said counter means upon the generation of the leading edge of each of said reset rectangular signals; and a digital-to-analog converter coupled to the output of said storage means for converting the count stored in said storage means into an analog signal, said converter means includes a plurality of resistors wired in parallel and coupled to the output of said storage means, each of said resistors representing a binary weight and having a value inversely proportional to its represented binary weight.

3. The circuit of claim 1 which further includes a one-shot circuit coupled to said power amplifier and said logic means, said one-shot circuit being triggered upon the generation of the leading edge of said reset rectangular signal to condition the one-shot circuit for disabling the power amplifier from supplying power to the motor after the elapse of a predetermined time period.

4. The circuit of claim 2 in which said ramp generating means includes:
    a resistor-capacitor network with the resistor and the capacitor wired in series and in which one end of the resistor is connected to said supply voltage to produce a ramp voltage whose time constant varies with the level of the supply voltage.

5. The circuit of claim 4 in which said comparing means has inverting and non-inverting inputs, said inverting input coupled to the output of said resistor-capacitor network and said non-inverting input coupled to the output of said digital-to-analog converter whereby upon the ramp voltage equalling the output voltage of the digital-to-analog converter, the output of the comparing means is switched to output said control signal to said amplifier means whereby the amplifier means will produce a voltage pulse width in accordance with the time said ramp voltage takes to equal said output voltage.

6. In an apparatus for regulating the speed of a D.C. motor where the voltage supply to the motor and the torque applied to the motor may vary, comprising:
    a source of supply voltage whose level varies with the speed of the motor;
    a disc coupled to the motor and rotating therewith and having a plurality of annularly arranged detectable elements;
    detector means disposed in relation to said disc for scanning the elements and providing a plurality of time-varying reset signals whose repetition rate is dependent on the rotation of said motor;
    a source of timing pulses having a repetition rate greater than the repetition rate of said reset signals;
    logic means coupled to the output of said detector means and said source of timing pulses to generate a reset rectangular waveform signal for each reset signal received;
    counter means coupled to the output of said source of timing pulses and said logic means to count the timing pulses being reset by said rectangular reset waveform signal wherein the counter means will begin counting following each resetting of the counter means;

means coupled to the output of said counter means to generate a time-varying reference voltage signal representing the torque applied to the motor in accordance with the output count of the counter means generated between succeeding rectangular reset waveform signals;

means coupled to the supply voltage for the generating a ramp voltage signal having a time constant porportional to the level of the supply voltage applied to the motor;

comparator means coupled to the output of said reference signal generating means and said ramp generating means to output a control signal upon the level of said ramp voltage signal equalling the level of said reference voltage signal;

and power amplifier means coupled to the output of said comparator means and said source of supply voltage for outputting a voltage pulse to the motor whose width is determined by the time said control signal is generated by said comparator means.

7. The apparatus of claim 6 in which said reference voltage generating means includes:

register means coupled to the output of said counter means and said logic means and enabled by the leading edge of each of said reset rectangular waveform signals to store the count appearing on the output of the counter means;

and a digital-to-analog converter coupled to the output of said register means to output an analog waveform signal equivalent to the count stored in said register means, said converter comprising a plurality of first resistors wired in parallel and a second resistor wired in series with said first resistor, with each of said first resistors representing a different binary weight and having a value inversely proportional to its represented binary weight with the second resistor having a value equal to the value of the first resistor representing the lowest binary weight.

8. The apparatus of claim 7 in which said logic means includes first and second serially-connected bistable circuits connected to said source of timing pulses, the first bistable circuit enabling said register means and the second bistable circuit enabling the resetting of the counter means in response to receiving said timing pulses.

9. The apparatus of claim 8 which further includes a retriggerable one-shot circuit coupled to said power amplifier and said second bistable means, said one-shot circuit being triggered upon the generation of the leading edge of said reset rectangular signal to output a pulse of a fixed reference width enabling the operation of the power amplifier during said output.

10. The apparatus of claim 7 in which said ramp generating means includes a resistor-capacitor network with the resistor and the capacitor wired in series in which one end of the resistor is connected to said source of supply voltage to produce a ramp voltage whose time constant varies with the level of the supply voltage.

11. The apparatus of claim 10 in which said comparator means has as a first input the output of said resistor-capacitor network and as a second input the output of said digital-to-analog converter for outputting said control signal upon the first input equalling the second input, said control signal disabling the power amplifier from outputting a voltage pulse to the motor.

* * * * *